Patented Dec. 17, 1935

2,024,924

UNITED STATES PATENT OFFICE 2,024,924

PROCESS OF MAKING XANTHATES

Wilhelm Hirschkind, Berkeley, William D. Ramage, Pittsburg, and Harry Bender, Concord, Calif., assignors to Great Western Electro-Chemical Company, San Francisco, Calif., a corporation of California No Drawing. Application June 25, 1932,
Serial No. 619,272

10 Claims. (Cl. 260—54)

This invention relates to a method of manufacture of xanthates of any alcohol, particularly those of alkali metals. The method of manufacture of our invention enables xanthates to be produced of such an initial high purity that refinement is unnecessary. Xanthates are derivatives of a dithiocarbonic acid, particularly sulphothiocarbonic acid or thioncarbonthiol acid $$S=C\begin{matrix}OH\\SH\end{matrix}$$

In ordinary xanthate practise it has been found desirable to conduct the reaction at a temperature below about 35° C. and statements that this is the highest temperature permissible are found in the literature. If the temperature is above 35° C. undesirable side reactions occur with the formation of thiocarbonates and sulphides that contaminate the xanthate product. In the case of ethyl alcohol, the reaction takes place satisfactorily at 20° C. the side reactions being inconsiderable and little, if any, sulphide is formed. However, as the temperature is lowered, the rate of xanthate formation decreases and in case of higher alcohols, becomes so low that xanthate formation does not occur in a practical amount.

In the practise of our invention, alcoholate is formed as by the reaction between caustic alkalies and alcohol as follows:

(1)  $KOH + C_2H_5OH \longrightarrow C_2H_5OK + H_2O$

This reaction does not require anhydrous alcohol and the water formed upon manufacture of the alcoholate and that present in the alcohol is either removed or combined with another material so that, as far as the subsequent xanthation reaction (2) is concerned, the water is inactive.

(2)  $C_2H_5OK + CS_2 \longrightarrow S=C\begin{matrix}OC_2H_5\\SK\end{matrix}$

With the present invention a desired xanthate can be produced, which is free of side reaction products, by a process that does not include cooling to prevent the exothermic xanthation reaction from forming the impurities in the xanthate. The trouble, expense and effect of the inability to cool the reaction mass equally are all obviated by this invention while a commercially salable product, substantially free of undesirable impurities, is produced directly. The exothermic reaction is, according to this invention, allowed to proceed without cooling and we have successfully formed relatively pure xanthate at a temperature as high as 80° C. by removing the water as an available reactant or free constituent in the reacting mass.

According to our present invention, the presence of water during the reaction between carbon bisulphide and alcoholate is what allows the side reactions to take place. We have found that the hydrolysis of reacting constitutents and subsequent formation of contaminating thiocarbonates and sulphides depends on the amount of water present and that these are produced in proportion to the amount of water present. Thus, with water absent as a free constituent in the mass undergoing xanthation, side reaction products are substantially absent.

According to this invention, the water formed upon manufacture of the alcoholate or present in the alcohol is prevented from affecting the alcoholate—carbon bisulphide reaction so that the temperature can be above that to which the process has heretofore been restricted and we are able to form substantially pure xanthates without cooling and at high temperatures heretofore deemed impractical. The removal of the water as an available reactant or constituent is accomplished either by actual physical removal of the water from the alcoholate as by distilling an azeotropic mixture as in the U. S. Patent 1,712,830, or by the use of a dehydrating agent which takes up the water and removes it as an available free constituent in the alcoholate. We have successfully added a dehydrator to the hydroxide-alcohol mixture to take up the water as fast as formed and anhydrous $Na_2SO_4$, $Na_2CO_3$, $CaO$, $CaSO_4$ and $Na_3PO_4$ have been used successfully. The hydrate and unused dehydrator, if any, can be left in the alcoholate and the xanthate subsequently leached from the hydrate with a solvent or the alcoholate can be leached from the hydrate with a solvent, the hydrate being left behind in both instances. A dehydrator should be chosen which does not lose water either partially or wholly, under the conditions of the reaction.

In the following examples we have disclosed several processes as examples of how our invention has been successfully carried out. These examples are illustrative only and are not to be taken as limiting the invention. As leaching equipment, a Soxhlet extractor, an elutriator or other suitable means can be employed.

Example 1

46 lbs. of absolute ethyl alcohol, 62.4 lbs. of 90% caustic potash, and 80 lbs. of burned lime were agitated together for two hours in a jacketed mixer, at a temperature of approximately 75° C. The reaction mixture was then leached with 150 gallons of benzol at a temperature of 50° C., the benzol being added in four successive portions. 77 lbs. of 99% carbon bisulphide was added to the benzol-alcoholate solution with agitation. The resulting xanthate was freed from benzol by heating in a jacketed kettle with agitation and the benzol was recovered. The yield was over 90% of 98% potassium ethyl xanthate.

*Example 2*

89.8 lbs. of 98% diethyl carbinol, 62.4 lbs. of 90% caustic potash, and 80 lbs. of burned lime were agitated together for two hours in a jacketed mixer, at a temperature of approximately 75° C. The reaction mixture was then leached with 150 gallons of benzol at a temperature of 50° C., the benzol being added in four successive portions. 77 lbs. of 99% carbon bisulphide was added to the benzol-alcoholate solution with agitation. The resulting xanthate was freed from benzol by heating in a jacketed kettle with agitation, the benzol being recovered. The yield was over 90% of 97% potassium xanthate.

*Example 3*

75.5 lbs. of 98% butanol, 62.4 lbs. of 90% caustic potash, and 80 lbs. of burned lime were agitated together for two hours in a jacketed mixer, at a temperature of approximately 75° C. The reaction mixture was then leached with approximately 100 gallons of benzol in a Soxhlet extraction apparatus. 77 lbs. of 99% carbon bisulphide was added to the benzol-alcoholate solution with agitation. The resulting xanthate was freed from benzol by heating in a jacketed kettle with agitation. The benzol was recovered. The yield was over 90% of 98% potassium butyl xanthate.

*Example 4*

51 lbs. of 95% ethyl alcohol, 80 lbs. of burned lime and 42.5 lbs. of ground caustic soda were agitated together for two hours at a temperature of about 75° C. in a jacketed mixer. The resulting mixture was leached with toluol to remove the alcoholate. The toluol-alcoholate mixture was then reacted with carbon bisulphide, 77 lbs. being added. The resulting xanthate was freed from the toluol by heating and condensing the toluol, the xanthate yield amounting to over 90% of 98% sodium ethyl xanthate.

The invention can be practised with xanthate formations generally and is generic to all alcoholates of primary, secondary and tertiary alcohols. Thus, it has been successfully applied to the formation of xanthates of primary alcohols as ethyl, butyl and furfuryl alcohols, secondary alcohols as methyl ethyl carbinol and diethyl carbinol, and tertiary alcohols as trimethyl carbinol.

The partially hydrated dehydrator can be left in the alcoholate instead of leaching the alcoholate from the hydrate as in the above examples. In some instances it is desirable that the alcoholate be leached from the hydrate before the carbon bisulphide is added to the alcoholate solution. In other instances the xanthate can be advantageously separated as by leaching from the final reaction mass containing the hydrate. In other instances the dehydrator, in hydrated form, can be left in both the alcoholate and xanthate to stabilize the xanthate, more desiccant being used than is necessary to take up the water present in the alcoholate. Thus, with the xanthate formed from furfuryl alcohol we have found that the dehydrator is preferably left in the xanthate an excess of the desiccant being employed. The xanthate is thereby stabilized and can be dried, shipped and handled, whereas, without the salt, the furfuryl alcohol xanthate is very unstable. Furfuryl xanthates are disclosed in the patent to Keller 1,833,464; they are compounds including a five membered ring formed by four carbon atoms and a fifth noncarbon atom which, in the case of furfuryl alcohol, is oxygen.

*Example 5*

98 lbs. of absolute furfuryl alcohol and 62 lbs. of 90% KOH were reacted, the water being taken up by 160 lbs. of anhydrous $Na_2CO_3$, both the water present in the KOH and the water created upon formation of the furfuryl alcoholate. The hydrated and unhydrated $Na_2CO_3$ was left in the alcoholate, and 78 lbs. of $CS_2$ were added and potassium furfuryl xanthate containing partially hydrated $Na_2CO_3$ was formed. The partially hydrated $Na_2CO_3$ was left in the xanthate thereby stabilizing the xanthate and permitting the product to be dried, shipped, stored and handled without the xanthate decomposing as it does when the desiccant is absent. It is to be noted that the amount of sodium carbonate is in excess of that required to take up the water formed when the alcoholate is manufactured so that the final product is stabilized, containing unhydrated desiccant material even though the xanthate is substantially free of water, either free or water of crystallization. In the same manner, water free xanthates, those formed for instance by use of an anhydrous alcoholate, can be rendered stable by adding a quantity of a desiccant to the already water free xanthate.

The salt or desiccating material employed to free the alcoholate of available free water should be such that it does not lose the water under any subsequent condition of the xanthation process. Thus, the temperature of the reaction should be kept below the transition point where the salt gives up its water of crystallization or the hydrated dehydrator gives up its water of hydration.

We claim:—

1. An alkali metal furfuryl xanthate containing an unhydrated desiccant.

2. Potassium furfuryl xanthate containing an unhydrated desiccant.

3. Potassium furfuryl xanthate containing sodium carbonate free of water of crystallization.

4. A mixture of an alkali metal xanthate and a desiccant material, said mixture including a quantity of said desiccant sufficient to take up any free water present in said mixture or bound to said xanthate as water of crystallization.

5. A xanthation process comprising reacting together in the presence of a desiccant carbon bisulphide and an anhydrous alkali metal alcoholate of an aliphatic monohydric unsubstituted saturated alcohol in substantially molecular proportions and in such quantities that the heat of reaction raises the temperature of the desiccant, reacting bisulphide, alcoholate and the resulting xanthate so that the reaction proceeds at a high rate without requiring external heating to produce as a direct product of the reaction a stable, dry and pure xanthate containing said desiccant but substantially free of any water, side reaction products, unreacted constituents and mother liquor.

6. A xanthation process comprising reacting together in the presence of a desiccant carbon bisulphide and an anhydrous alkali metal alcoholate of an aliphatic monohydric unsubstituted saturated primary alcohol in substantially molecular proportions and in such quantities that the heat of reaction raises the temperature of the desiccant, reacting bisulphide, alcoholate and the resulting xanthate so that the reaction proceeds at a high rate without requiring external heating to produce as a direct product of the reaction a stable, dry and pure xanthate containing said desiccant but substantially free of any water, side reaction products, unreacted constituents and mother liquor.

7. A xanthation process comprising reacting together in the presence of a desiccant carbon bisulphide and an anhydrous alkali metal alcoholate of an aliphatic monohydric unsubstituted saturated secondary alcohol in substantially molecular proportions and in such quantities that the heat of reaction raises the temperature of the desiccant, reacting bisulphide, alcoholate and the resulting xanthate so that the reaction proceeds at a high rate without requiring external heating to produce as a direct product of the reaction a stable, dry and pure xanthate containing said desiccant but substantially free of any water, side reaction products, unreacted constituents and mother liquor.

8. A xanthation process comprising reacting together in the presence of a desiccant carbon bisulphide and an anhydrous alkali metal alcoholate in substantially molecular proportions and in such quantities that the heat of reaction raises the temperature of the desiccant, reacting bisulphide, alcoholate and the resulting xanthate so that the reaction can proceed at a high rate without external heating to produce as a direct product of the reaction a stable, dry and pure xanthate containing said desiccant but substantially free of any water, side reaction products, unreacted constituents and mother liquor.

9. Reacting in molecular proportions an anhydrous alcoholate with carbon bisulphide in the presence of an unhydrated desiccant to precipitate a xanthate on said desiccant.

10. A stable dry and pure xanthate precipitated in a dry and stable form as a direct reaction product upon reaction of carbon bisulphide and an alkali metal alcoholate in the presence of and containing an unhydrated desiccant.

WILHELM HIRSCHKIND.
WILLIAM D. RAMAGE.
HARRY BENDER.